US011198084B2

(12) United States Patent
Baut et al.

(10) Patent No.: US 11,198,084 B2
(45) Date of Patent: Dec. 14, 2021

(54) HOUSING WITH FILTER FOR PURGE VALVE PROTECTION

(71) Applicant: WABCO EUROPE BVBA, Brussels (BE)

(72) Inventors: Mateusz Baut, Wroclaw (PL); Blazej Marcinkiewicz, Wroclaw (PL); Karol Pawlowski, Przemysl (PL)

(73) Assignee: ZF CV Systems Europe BV, Brussels (BE)

( * ) Notice: Subject to any disclaimer, the term of this patent is extended or adjusted under 35 U.S.C. 154(b) by 188 days.

(21) Appl. No.: 16/710,460

(22) Filed: Dec. 11, 2019

(65) Prior Publication Data

US 2020/0188826 A1 Jun. 18, 2020

(30) Foreign Application Priority Data

Dec. 12, 2018 (EP) ..................................... 18211898

(51) Int. Cl.
| | | |
|---|---|---|
| *B01D 46/00* | (2006.01) | |
| *B01D 46/24* | (2006.01) | |
| *F04D 29/32* | (2006.01) | |
| *B60T 17/00* | (2006.01) | |

(52) U.S. Cl.
CPC ...... *B01D 46/0005* (2013.01); *B01D 46/2411* (2013.01); *F04D 29/321* (2013.01)

(58) Field of Classification Search
CPC ............ B01D 46/0005; B01D 46/2411; B01D 46/10; B01D 2265/00; F04D 29/321; B60T 17/006; B60T 17/008; B60T 17/004; B60T 17/002
See application file for complete search history.

(56) References Cited

U.S. PATENT DOCUMENTS

| | | | | |
|---|---|---|---|---|
| 2007/0144350 | A1* | 6/2007 | Paling | B01D 53/261 96/134 |
| 2009/0038476 | A1* | 2/2009 | Blackwood | B60T 17/002 96/115 |
| 2009/0199523 | A1 | 8/2009 | Hilberer | |

FOREIGN PATENT DOCUMENTS

| | | |
|---|---|---|
| EP | 2505444 A2 | 10/2012 |
| WO | 2004103509 A2 | 12/2004 |

OTHER PUBLICATIONS

Machine assisted English translation of EP2505444A2 obtained from https://patents.google.com on Dec. 10, 2019, 12 pages.

* cited by examiner

*Primary Examiner* — Lucas A Stelling
*Assistant Examiner* — Hafiz Muhammad Aamir
(74) *Attorney, Agent, or Firm* — Warner Norcross + Judd LLP

(57) ABSTRACT

Provided is a pneumatic system for a vehicle, in particular a commercial vehicle. The system comprises a compressor, an air dryer cartridge, and a purge valve. The purge valve is protected by a filter. The filter is arranged in a housing and covers an inlet of an air channel formed in the housing which connects the inlet and the purge valve.

11 Claims, 4 Drawing Sheets

HOUSING WITH FILTER FOR PURGE VALVE PROTECTION

CROSS-REFERENCE TO RELATED APPLICATIONS

This application claims priority to European Patent Application No. 18211898, filed Dec. 12, 2018, which is incorporated herein by reference in its entirety.

FIELD OF THE DISCLOSURE

The present disclosure generally relates to pneumatic systems. More specifically, the present invention relates to pneumatic systems for vehicles.

BACKGROUND

EP 2 505 444 A2 teaches a pneumatic system with an air dryer cartridge and a purge valve protected by a filter. The filter is inserted into an air channel connected to the purge valve and is arranged substantially parallel to the air channel.

BRIEF SUMMARY

Disclosed is a pneumatic system for a vehicle. The pneumatic system comprises a compressor; an air dryer cartridge; and a purge valve. The purge valve is protected by a filter. The filter is arranged in a housing which covers an inlet of an air channel formed in the housing which connects the inlet and the purge valve.

BRIEF DESCRIPTION OF DRAWINGS

The foregoing aspects and many of the attendant advantages will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

Figure 1:
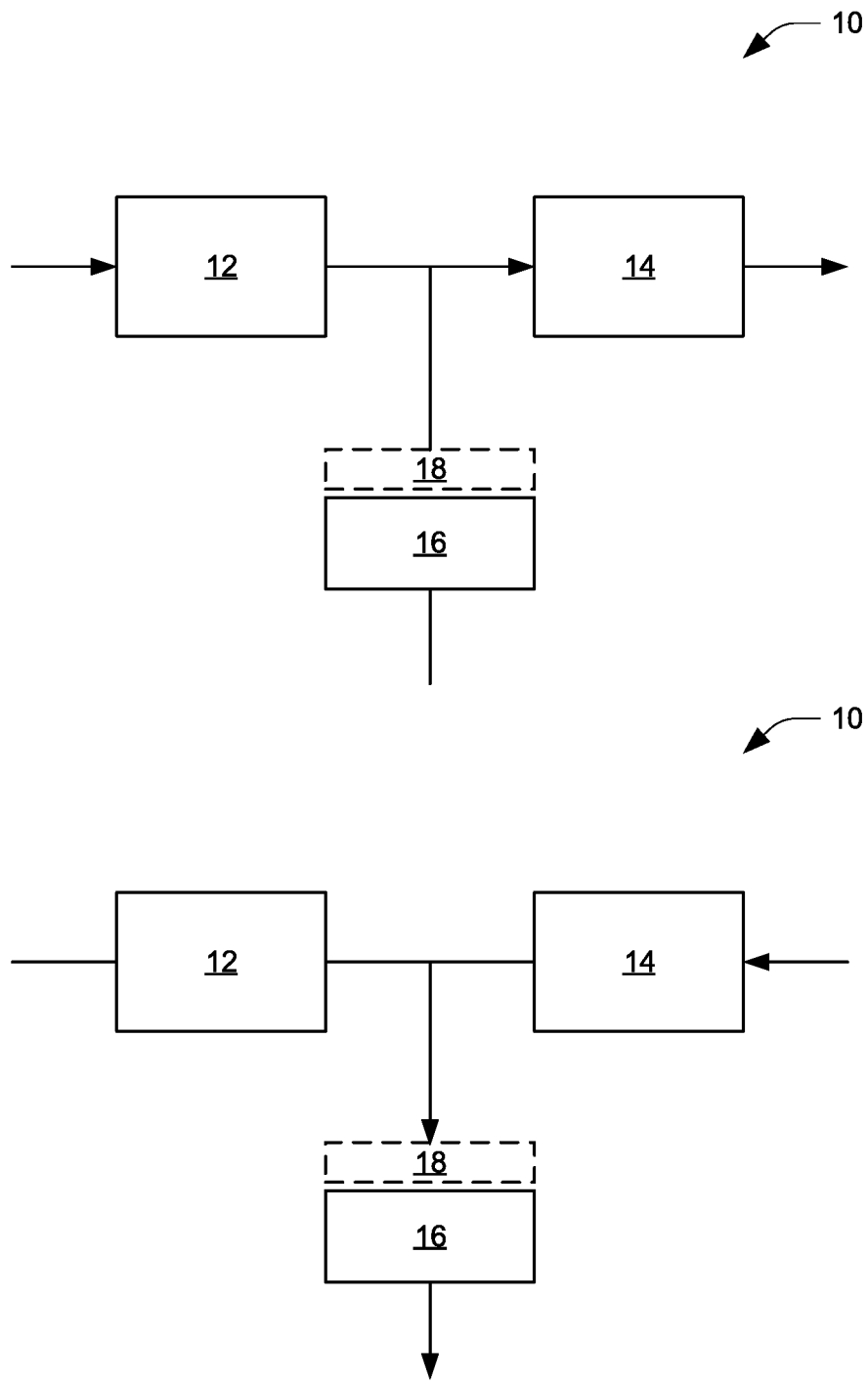
FIG. 1 shows a block diagram of components of an exemplary system.

The present disclosure provides a pneumatic system for a vehicle, in particular for a commercial vehicle.

The pneumatic system comprises a compressor, an air dryer cartridge, and a purge valve. The purge valve is protected by a filter that is arranged in a housing and covers an inlet of an air channel formed in the housing which connects the inlet and the purge valve.

In this regard, the term "compressor", as used throughout the description and the claims, particularly refers to a device which is configured to take in ambient air and feed compressed air into a channel, thereby controlling the air pressure within the channel. Furthermore, the term "compressed air", as used throughout the description and the claims, particularly refers to air at a pressure which is above the atmospheric pressure (e.g., 8.5 Bar above the atmospheric pressure).

Moreover, the term "air dryer cartridge", as used throughout the description and the claims, particularly refers to a cartridge filled with a filter material that withdraws humidity from compressed air flowing through the cartridge, wherein the condensate can be removed by purging the cartridge with dry air. Furthermore, the term "valve", as used throughout the description and the claims, particularly refers to a pneumatic component which allows controlling the flow of compressed air by actuation.

As the filter covers the air inlet (where the filter surface is arranged substantially perpendicular to the direction of the air flow) instead of being inserted into the air channel (where the filter surface is arranged substantially parallel to the direction of the air flow), the air channel dimensions can be reduced and manufacturing/assembling the system can be facilitated.

The filter may comprise a loop which is placed around a pin protruding from the housing to hold the filter in place.

That is, the pin may inhibit a movement perpendicular to the direction of the air flow.

The filter may comprise a spring element which is pressed down by the air dryer cartridge and prevents the loop from slipping off the pin.

That is the air dryer cartridge may be placed on top of the filter such that compressed air discharged from the air dryer cartridge is guided directly onto the filter.

The filter may comprise a substantially flat portion with a multitude of openings of a same size and the spring element may be formed by a cantilever cut-out and protruding from the substantially flat portion.

Accordingly, the spring element is an integral part of the filter, thereby reducing the number of parts required for assembly and reducing the assembly effort. Moreover, the spring element reduces the accuracy requirements regarding the dimensions of the filter and the air dryer cartridge.

The substantially flat portion may have a shape of a ring segment when seen in a direction perpendicular to the substantially flat portion.

That is, if the housing has a (substantially) cylindrical shape, the filter surface may extend in the radial direction of the housing.

The loop may extend from one side of the ring segment shape when seen in the direction perpendicular to the substantially flat portion.

In other words, the loop may extend from one side of the ring segment shape when seen in the direction parallel to the direction of the air flow.

The openings of the same size may be grouped into at least two ring segments divided by a ring segment which is free of openings to increase the stability of the filter.

The filter may be made of plastic.

For example, the filter may be made of polyamide.

The openings may have a diameter in a range of 0.85 mm to 1.25 mm.

The substantially flat portion may have an area that is larger than an area of a cross-section of the air channel perpendicular to the direction of flow of the filtered air.

Thus, air resistance can be reduced.

The filter may have a circumferential border extending in the direction of flow of the filtered air and enclosing a cavity upstream of the inlet.

It will be appreciated that the features and attendant advantages of the disclosed system may be realized by a method of manufacturing or operating the system. Moreover, it is noted that throughout the description, features in brackets are to be regarded as optional.

FIG. 1 shows a block diagram of components of an exemplary pneumatic system 10 which may be employed in a vehicle, for instance in a commercial vehicle. The system comprises a compressor 12, an air dryer cartridge 14 upstream of the compressor 12 and a purge valve 16 for exhausting compressed air from an air channel connecting the compressor 12 and the air dryer cartridge 14. As illustrated in FIG. 1, compressed air from the compressor 12 intake is guided through the air dryer cartridge 14 which removes humidity from the compressed air. The compressed air may then be fed to a storage tank.

When the storage tank is full, the purge valve 16 may be opened to reverse the flow of compressed air, such that the (dry) compressed air flows back from the storage tank through the air dryer cartridge 14 and removes condensate from the air dryer cartridge 14. To improve the efficiency of the cycle, the temperature within the air dryer cartridge 14 may be changed from cold to warm, and vice versa. For example, the air dryer cartridge 14 may be provided or configured with heating capabilities for heating the air dryer cartridge 14 before or during purging.

Figure 2:
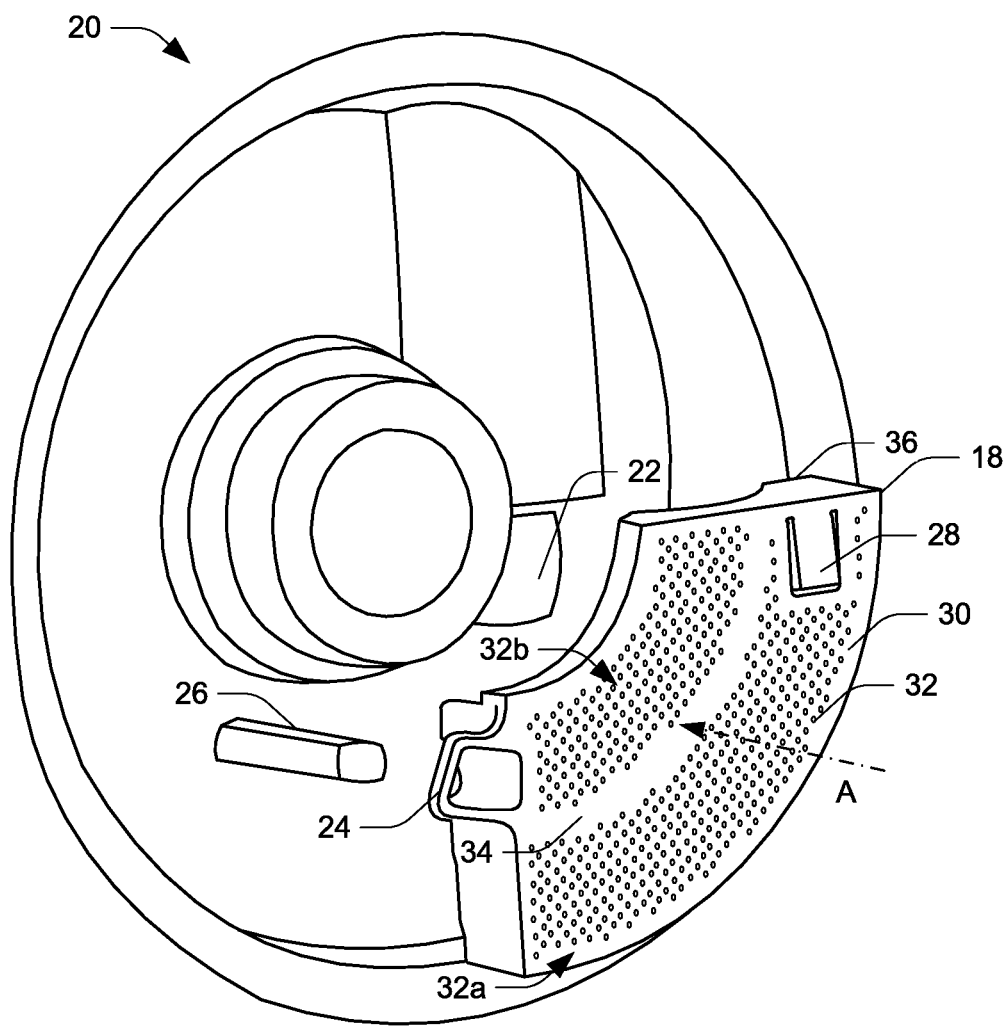
FIG. 2, FIG. 3, and FIG. 4 show perspective views illustrating the assembly of an exemplary filter in the exemplary system.
Figure 3:
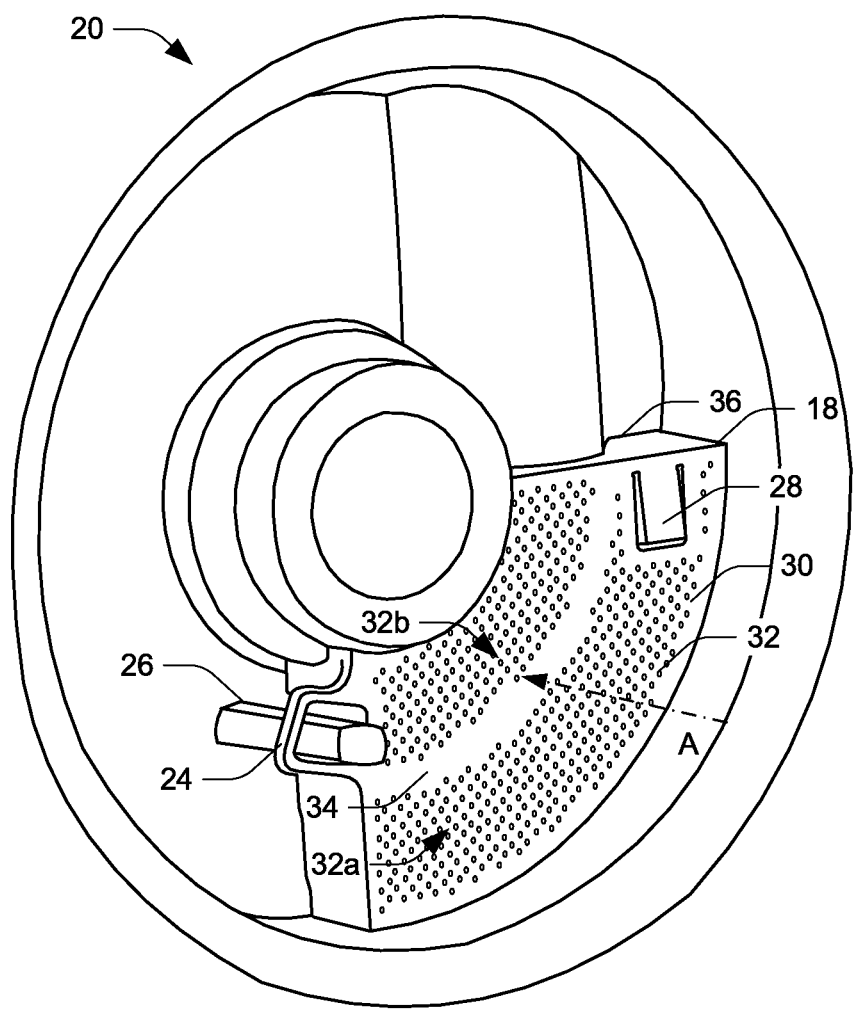

To prevent particles such as particles produced by the operation of the compressor 12 from entering and possibly contaminating the purge valve 16, the purge valve 16 is protected by a filter 18 upstream of the purge valve 16. As illustrated in FIG. 2 and FIG. 3, the filter 18 is installed in a cylindrical housing 20 and covers an inlet 22 of an air channel formed in the housing 20 which connects the inlet 22 and the purge valve 16. During the initial assembly or during replacement, the filter 18 is placed over the inlet 22.

To secure the filter 18 in place, the filter 18 may comprise a material loop 24 which is placed around a pin 26 protruding from the housing 20. In other words, when the axis of the cylindrical housing is parallel to the vertical and the inlet 22 points up, the filter 18 may be lowered down in a movement parallel to the vertical until the loop 24 is caught by the pin 26. The pin 26 may be pointed, so that by pushing the loop 24 down the pin 26, the filter 18 is fixed to the housing 20. Once pushed down, the loop 24 might closely fit to all sides of the pin 26, or there may be a gap between one or two sides of the loop 24 and the pin 26, such that small manufacturing inaccuracies can be tolerated.

Figure 4:
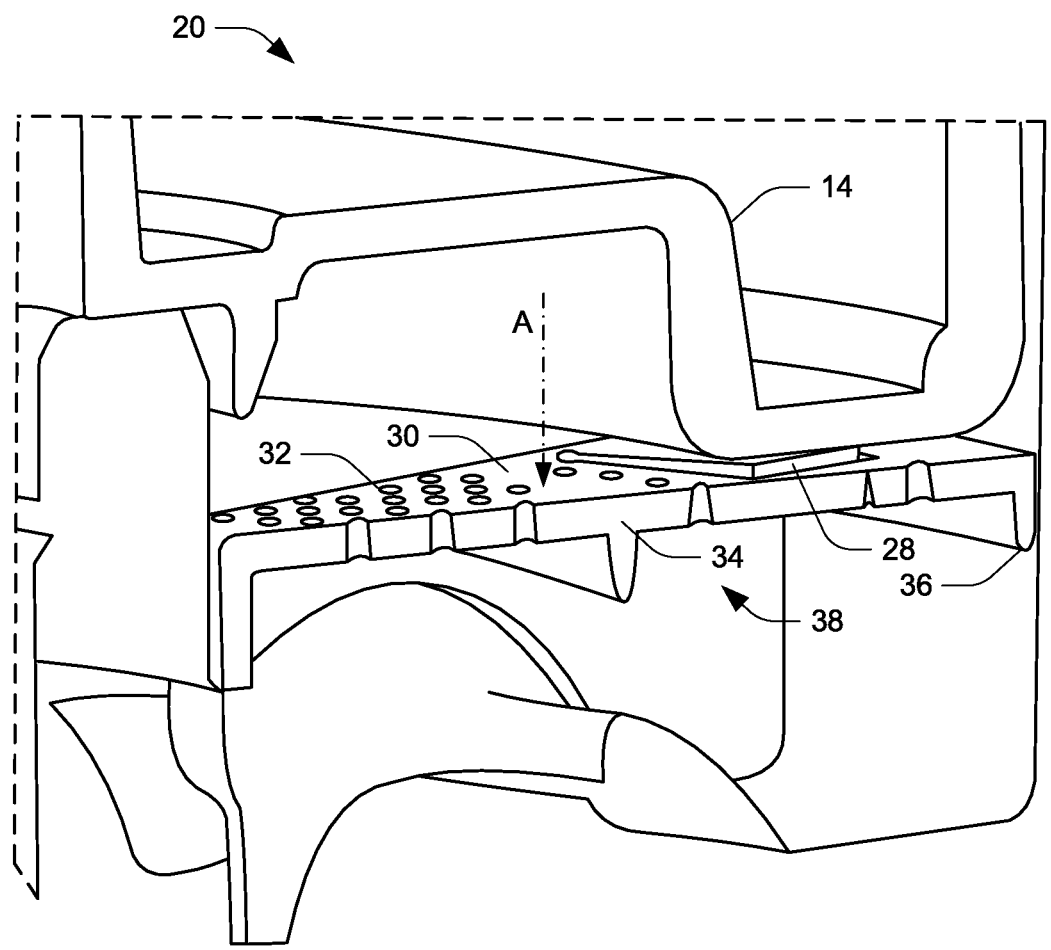

As illustrated in FIG. 4, the filter 18 may comprise a spring element 28 which is pressed down by a lid or the air dryer cartridge 14 and prevents the loop 24 from slipping off the pin 26. The spring element 28 may be formed by a cantilever cut-out and protruding from a substantially flat portion 30 with a multitude of openings 32 of a same size through which the compressed air is guided for decontamination. The substantially flat portion 30 has a shape of a (90°) ring segment when seen in a direction A perpendicular to the substantially flat portion 30, wherein the loop 24 extends from one side of the ring segment.

The openings 32 are grouped into at least two ring segments 32a, 32b divided by a ring segment 34 which is free of openings 32 to increase the stability of the filter 18. As can be seen in FIG. 4, the ring segment 34 may be provided with a fin (extending in the radial and axial direction) to further increase the stability of the filter 18. The filter 18 may be made of a material which is resistant to high temperatures and corrosion such as stainless steel or plastic (e.g., by molding).

The openings 32 may have a diameter in a range of 0.85 mm to 1.25 mm, where the diameter of an opening 32 may be smaller at the upstream side than at the downstream side to avoid particles being caught in the openings 32 while purging. To avoid excessive pressure loss, the substantially flat portion 20 may have an area that is larger than the area of a cross-section of the air channel perpendicular to the direction A of flow of the filtered air.

To avoid that air bypasses the filter 18, the filter 18 may have a circumferential border 36 extending in the direction A of flow of the filtered air and enclosing a cavity 38 upstream of the inlet 22. As can be seen from FIG. 2, the border 36 may be uneven to neatly fit to the structure of the housing 20. Moreover, the housing 20 and the border 36 may be designed in a way that avoids any misalignments, as the filter 18 only fits in one place.

LIST OF REFERENCE NUMERALS 10 system
12 compressor
14 cartridge
16 valve
18 filter
20 housing
22 inlet
24 loop
26 pin
28 spring element
30 flat portion
32 openings
34 ring segment
36 border
38 cavity The terms "comprising" or "comprise" are used herein in their broadest sense to mean and encompass the notions of "including," "include," "consist(ing) essentially of," and "consist(ing) of. The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-25, ±0-10, ±0-5, or ±0-2.5, % of the numerical values. Further, The term "about" applies to both numerical values when associated with a range of values. Moreover, the term "about" may apply to numerical values even when not explicitly stated.

Generally, as used herein a hyphen "-" or dash "—" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A pneumatic system for a vehicle comprising:
   a compressor;
   an air dryer cartridge; and
   a purge valve;
   wherein the purge valve is protected by a filter;
   the filter being arranged in a housing which covers an inlet of an air channel formed in the housing which connects the inlet and the purge valve; and
   wherein the filter comprises a loop disposed around a pin protruding from the housing, to hold the filter in place.

2. The system of claim 1 wherein the filter comprises a spring element which is pressed down by the air dryer cartridge and prevents the loop from slipping off the pin.

3. The system of claim 2, wherein the filter comprises a substantially flat portion with a multitude of openings of a same size and the spring element is formed by a cantilever cut-out and protruding from the substantially flat portion.

4. The system of claim 3, wherein the substantially flat portion has a shape of a ring segment when seen in a direction perpendicular to the substantially flat portion.

5. The system of claim 4, wherein the loop extends from one side of the ring segment when seen in the direction perpendicular to the substantially flat portion.

6. The system of claim 4, wherein the openings of the same size are grouped into at least two ring segments divided by a ring segment which is free of openings to increase the stability of the filter.

7. The system of claim 4, wherein the filter is made of plastic.

8. The system of claim 4, wherein the openings have a diameter in a range of 0.85 mm to 1.25 mm.

9. The system of claim 3, wherein the substantially flat portion has an area that is larger than an area of a cross-section of the air channel perpendicular to the direction of flow of the filtered air.

10. The system of claim 9, wherein the filter has a circumferential border extending in the direction of flow of the filtered air and enclosing a cavity upstream of the inlet.

11. A vehicle comprising the system of claim 1.

* * * * *